United States Patent
Contreras et al.

(10) Patent No.: US 9,047,926 B2
(45) Date of Patent: Jun. 2, 2015

(54) DUAL THERMAL SENSOR FOR HAMR WAVEGUIDE POWER MONITOR AND INTEGRATION WITH THE CONTACT SENSOR

(71) Applicant: HGST Netherlands B.V., Amsterdam (NL)

(72) Inventors: John T. Contreras, Palo Alto, CA (US); Lidu Huang, Danville, CA (US); Takuya Matsumoto, Sunnyvale, CA (US); Shen Ren, Union City, CA (US); Erhard Schreck, San Jose, CA (US); Barry C. Stipe, San Jose, CA (US)

(73) Assignee: HGST NETHERLANDS B.V., Amsterdam (NL)

(*) Notice: Subject to any disclaimer, the term of this patent is extended or adjusted under 35 U.S.C. 154(b) by 0 days.

(21) Appl. No.: 14/057,044

(22) Filed: Oct. 18, 2013

(65) Prior Publication Data
US 2015/0109892 A1 Apr. 23, 2015

(51) Int. Cl.
*G11B 11/00* (2006.01)
*G11B 33/14* (2006.01)
*G11B 5/48* (2006.01)
*G11B 5/00* (2006.01)

(52) U.S. Cl.
CPC ............ *G11B 33/144* (2013.01); *G11B 5/4866* (2013.01); *G11B 2005/0021* (2013.01)

(58) Field of Classification Search
CPC ............... G11B 2005/0021; G11B 2005/0024; G11B 2005/0032; G11B 5/314; G11B 5/6088

USPC ............................................ 369/13.32, 13.13
See application file for complete search history.

(56) References Cited

U.S. PATENT DOCUMENTS

| | | | |
|---|---|---|---|
| 7,710,686 B2 | 5/2010 | Kim et al. | |
| 8,149,653 B2 | 4/2012 | Shimazawa et al. | |
| 8,339,905 B2 | 12/2012 | Rausch et al. | |
| 8,369,191 B2 | 2/2013 | Shimazawa | |
| 8,391,107 B2 | 3/2013 | Gage et al. | |
| 8,406,090 B2 | 3/2013 | Juang et al. | |
| 8,406,091 B2 | 3/2013 | Shimazawa et al. | |
| 8,842,383 B1* | 9/2014 | Balamane et al. | 369/13.33 |
| 2011/0122737 A1 | 5/2011 | Shimazawa et al. | |
| 2011/0228651 A1 | 9/2011 | Gage et al. | |
| 2012/0051196 A1* | 3/2012 | Grobis et al. | 369/13.24 |
| 2012/0201108 A1 | 8/2012 | Zheng et al. | |
| 2013/0107390 A1* | 5/2013 | Huang et al. | 360/31 |
| 2013/0107680 A1* | 5/2013 | Contreras et al. | 369/13.32 |
| 2013/0258824 A1* | 10/2013 | Komura et al. | 369/13.33 |

OTHER PUBLICATIONS

Baoxi Xu et al.; "Dynamic Thermal Responses of Heat-Assisted Magnetic Recording Head in Data Writing Process"; IEEE Transactions on Magnetics, vol. 48, No. 11, Nov. 2012; Singapore.

* cited by examiner

*Primary Examiner* — Tan X Dinh
(74) *Attorney, Agent, or Firm* — Patterson & Sheridan, LLP

(57) ABSTRACT

Embodiments of the present invention generally relate to a HAMR device having two temperature sensors. The first temperature sensor is disposed adjacent a waveguide and is about two or more micrometers away from an air bearing surface. The first temperature sensor has a length, a width and a thickness, and the length is greater than the width and the thickness. The length of the first temperature sensor is substantially perpendicular to the waveguide.

21 Claims, 9 Drawing Sheets

DUAL THERMAL SENSOR FOR HAMR WAVEGUIDE POWER MONITOR AND INTEGRATION WITH THE CONTACT SENSOR

BACKGROUND

1. Field

Embodiments of the present invention generally relate to data storage systems, and more particularly, to thermally assisted recording devices.

2. Description of the Related Art

Higher storage bit densities in magnetic media used in disk drives have reduced the size (volume) of magnetic bits to the point where the magnetic bit dimensions are limited by the grain size of the magnetic material. Although grain size can be reduced further, the data stored within the magnetic bits may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as "thermally assisted (magnetic) recording" (TAR or TAMR), "energy assisted magnetic recording" (EAMR), or "heat-assisted magnetic recording" (HAMR) which are used interchangeably herein. It can be applied to longitudinal and perpendicular recording systems as well as "bit patterned media". Heating of the media surface has been accomplished by a number of techniques such as focused laser beams or near-field optical sources.

The optical power in the light delivery path of HAMR heads affects the heating temperature profile, and hence the recording quality during HAMR recording. During writing operations, optical power from laser diode (LD) may fluctuate due to mode hopping, temperature drift, and LD aging. Monitoring and controlling this optical power may improve HAMR recording quality, reliability and head lifetime. Therefore, an improved HAMR device is needed.

SUMMARY OF THE INVENTION

Embodiments of the present invention generally relate to a HAMR device having two temperature sensors. The first temperature sensor is disposed adjacent a waveguide and is about two or more micrometers away from an air bearing surface. The first temperature sensor has a length, a width and a thickness, and the length is greater than the width and the thickness. The length of the first temperature sensor is substantially perpendicular to the waveguide.

In one embodiment, a HAMR device is disclosed. The HAMR device includes a waveguide and a first temperature sensor disposed adjacent the waveguide. The first temperature sensor is about two or more micrometers away from an air bearing surface. The first temperature sensor has a length, a width and a thickness, and the length is greater than the width and the thickness. The length is substantially perpendicular to the waveguide.

In another embodiment, a HAMR device is disclosed. The HAMR device includes a return pole, a first cladding material disposed adjacent the return pole, a waveguide disposed adjacent the first cladding material, a first temperature sensor disposed adjacent the waveguide, a second cladding material disposed adjacent the waveguide, and a write pole disposed adjacent the second cladding material. The first temperature sensor is about two or more micrometers away from an air bearing surface. The first temperature sensor has a length, a width and a thickness, and the length is greater than the width and the thickness. The length is substantially perpendicular to the waveguide.

In another embodiment, a method is disclosed. The method includes providing a circuit including a contact sensor connected with a first node and a second node, a waveguide sensor connected with the first node and a third node, and a reference temperature sensor connected with the third node and the second node, setting a voltage at the first node equal to a voltage at the third node so no current is flowing through the waveguide sensor, and measuring a current difference between currents flowing through the contact sensor and the reference sensor to determine a change in a contact sensor resistance while subtracting effects from the ambient temperature. The current difference is measured through a differential transconductance low noise amplifier.

In another embodiment, a method is disclosed. The method includes providing a circuit including a contact sensor connected with a first node and a second node, a waveguide sensor connected with the first node and a third node, and a reference sensor connected with the third node and the second node, applying a voltage at the first node, and measuring a voltage at the third node to determine a change in a waveguide sensor resistance. The voltage is measured through a single-ended low noise amplifier.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention generally relate to a HAMR device having two temperature sensors. The first temperature sensor is disposed adjacent a waveguide and is about two or more micrometers away from an air bearing surface. The first temperature sensor has a length, a width and a thickness, and the length is greater than the width and the thickness. The length of the first temperature sensor is substantially perpendicular to the waveguide.

Figure 1A:
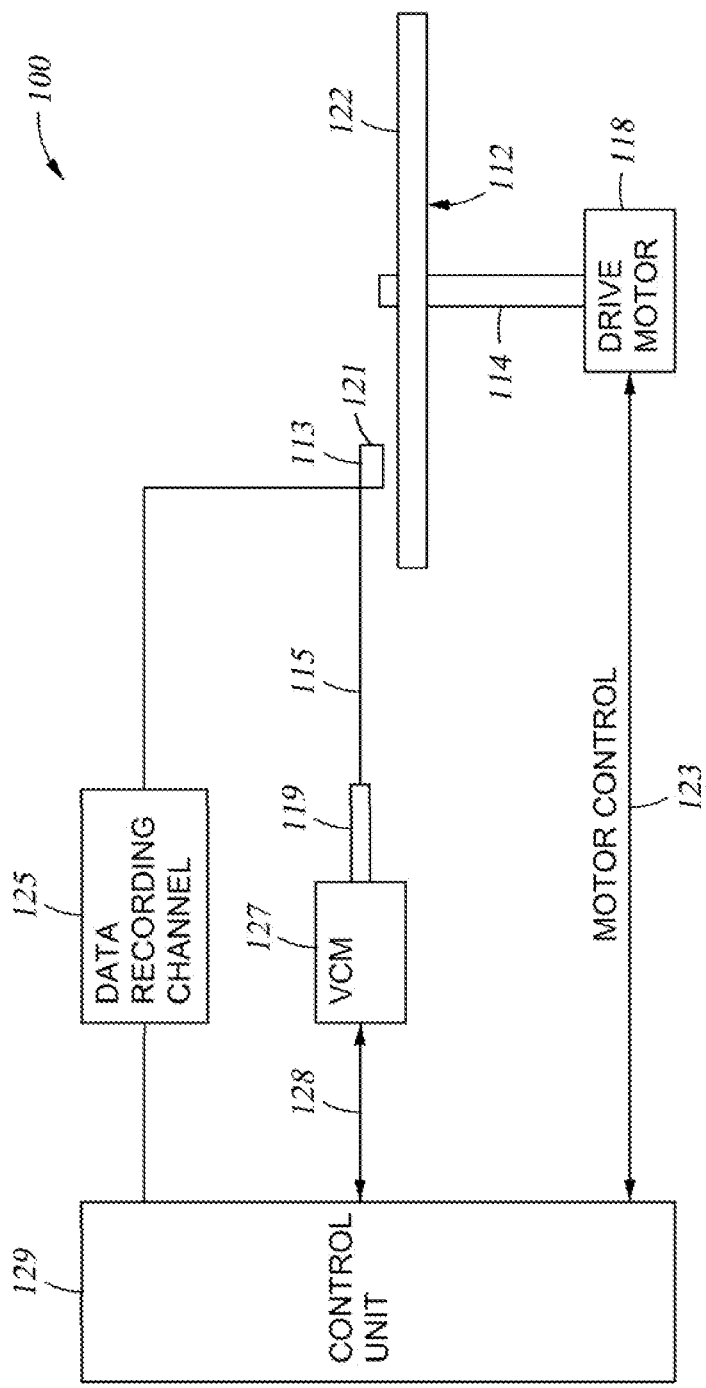
FIGS. 1A-1B illustrate a disk drive system, according to embodiments of the invention.

FIG. 1A illustrates a disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for healing the disk surface 122. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115, The suspension 115 provides a slight spring force which biases slider 113 towards the disk surface 122. Each actuator arm 119 is attached to an actuator means 127. The actuator means 127 as shown in FIG. 1A may be a voice coil motor (VCM). The VCM includes a coil movable within a fixed magnetic field, the direction and speed of the coil movements being controlled by the motor current signals supplied by control unit 129.

During operation of a TAR or HAMR enabled disk drive 100, the rotation of the magnetic disk 112 generates an air hearing between the slider 113 and the disk surface 122 which exerts an upward force or lift on the slider 113. The air bearing thus counter-balances the slight spring force of suspension 115 and supports slider 113 slightly above the disk 112 surface by a small, substantially constant spacing during normal operation. The radiation source heats up the high-coercivity data bits so that the write elements of the magnetic head assemblies 121 may correctly magnetize the data bits.

The various components of the disk storage system are controlled in operation by control signals generated by control unit 129, such as access control signals and internal clock signals. Typically, the control unit 129 includes logic control circuits, storage means and a microprocessor. The control unit 129 generates control signals to control various system operations such as drive motor control signals on tine 123 and head position and seek control signals on line 128. The control signals on line 12S provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only, it should be apparent that disk storage systems may contain a large number of disks and actuators, and each actuator may support a number of sliders.

Figure 1B:
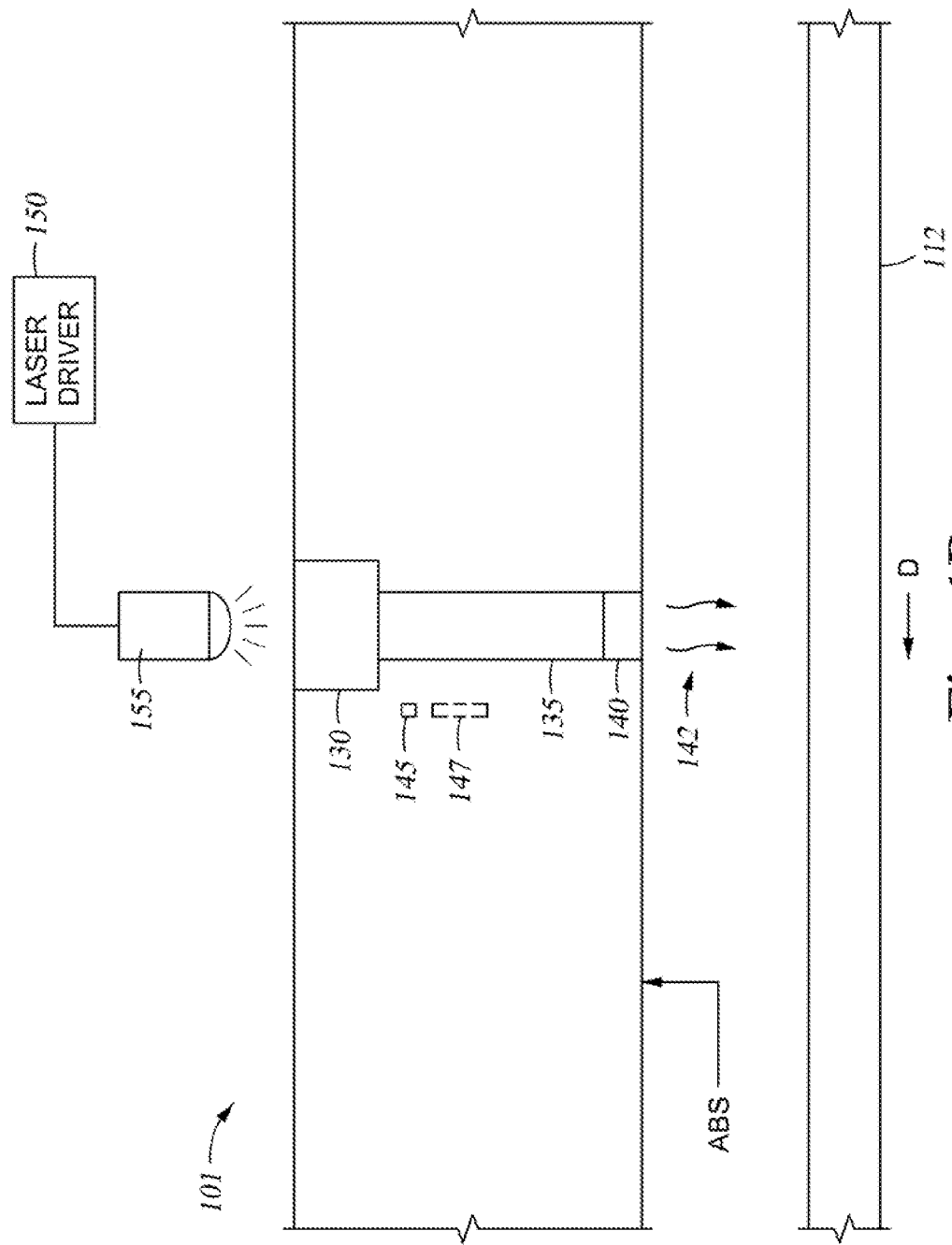

FIG. 1B is a cross sectional schematic of a HAMR enabled write head 101, according to one embodiment of the invention. The head 101 is operatively attached to a laser 155 that is powered by a laser driver 150. The laser 155 may be placed directly on the head 101 or radiation may be delivered from a laser 155 located off the slider 113 through an optical fiber or waveguide 135. Similarly, the laser driver 150 circuitry may be located on the slider 113 or on a system-on-chip (SOC) associated with the disk drive 100 such as control unit 129. The head 101 includes a spot-size converter 130 for focusing the radiation transmitted by the laser 155 into the waveguide 135. In another embodiment, the disk drive 100 may include one or more lens for focusing the beamspot of the laser 155 before the emitted radiation reaches the spot-size converter 130. The waveguide 135 is a channel that transmits the radiation through the height of the head 101 to a near field transducer 140—e.g., a plasmonic device or an optical transducer—which is located at or near the ABS. The waveguide 135 may extend in a direction that is substantially perpendicular to the ABS, as shown in FIG. 1B. Alternatively, the waveguide 135 may not extend in a direction that is substantially perpendicular to the ABS, due to turns in the plane of the substrate or for better coupling to the NFT 140. The NFT 140 further focuses the beamspot to avoid heating neighboring tracks of data on the disk 112—i.e., creates a beamspot much smaller than the diffraction limit. As shown by arrows 142, this optical energy emits from the NFT 140 to the surface of the disk 112 below the ABS of the head 101. The embodiments herein are not limited to any particular type of NFT and may operate with, for example, either a c-aperture, e-antenna plasmonic near-field source, or any other shaped transducer known in the art.

A temperature sensor 145, or a waveguide sensor, is located adjacent the waveguide 135. In one embodiment, the waveguide sensor 145 is an electrical wire extending between two contacts (not shown) in a direction that is substantially perpendicular to the direction of the waveguide 135. To aid fabrication, both the waveguide 135 and waveguide sensor 145 are in separate layers parallel to the substrate on which the waveguide 135 and the waveguide sensor 145 are fabricated. In one example, the waveguide 135 extends in a direction perpendicular to the ABS toward the NFT 140 and the waveguide sensor 145 extends in a cross-track direction. However, in cases where the waveguide 135 does not extend perpendicular to the ABS, the waveguide sensor 145 will continue to extend in a direction roughly perpendicular to the waveguide 135 and in the plane of the substrate. It is also possible for the waveguide sensor 145 to extend in a down track direction as indicated by arrow "D." The waveguide sensor 145 may be a thermistor or resistance temperature detector (RID) where the electrical resistance of the material comprising the waveguide sensor 145 changes as the temperature of the material varies (either inversely or directly). As the light from laser 155 goes through the waveguide 135, about five percent of the optical power is used to heat the waveguide sensor 145, causing the resistance of the waveguide sensor 145 to change. The waveguide sensor 145 may he electrically coupled to the laser driver 150 or some other control device to measure the electrical resistance of the waveguide sensor 145. This change may then be used as a feedback control signal to adjust the power of the laser 155. For example, the laser driver 150 may provide a constant voltage across the waveguide sensor 145. If the measured current begins to decrease—e.g., the electrical resistance of the waveguide sensor 145 increases—then the laser driver 150 may decrease the power of the laser 155 to decrease the temperature of the waveguide sensor 145 and presumably other components of the head 101. This feedback control permits the disk drive 100 to perform HAMR at a sufficient temperature with controlled track width and without damaging the head 101 by, for example, pole-tip protrusion or metal diffusion of the near-field transducer.

A second temperature sensor 147, or a reference sensor, may be located nearby the waveguide sensor 145 so the two sensors are at a similar background temperature. However, the second temperature sensor 147 may be farther away from the waveguide 135 than the waveguide sensor 145, thus the second temperature sensor 147 is illustrated in dolled line since the second temperature sensor 147 is not viewable from the cross sectional diagram shown in FIG. 1B. During writing with the laser 155, the difference in the resistance between the waveguide sensor 145 and the reference sensor 147 is measured. With the waveguide sensor 145 and the reference sensor 147, monitoring the optical power may be achieved while no optical components are needed, no additional assembly steps are needed, and no significant reflection is added to the system which can create adverse interference effects due to the coherency of the laser light. In addition, with two temperature sensors, temperature variation due to optical power fluctuation or slider flight condition change may be differentiated.

Figure 2A:
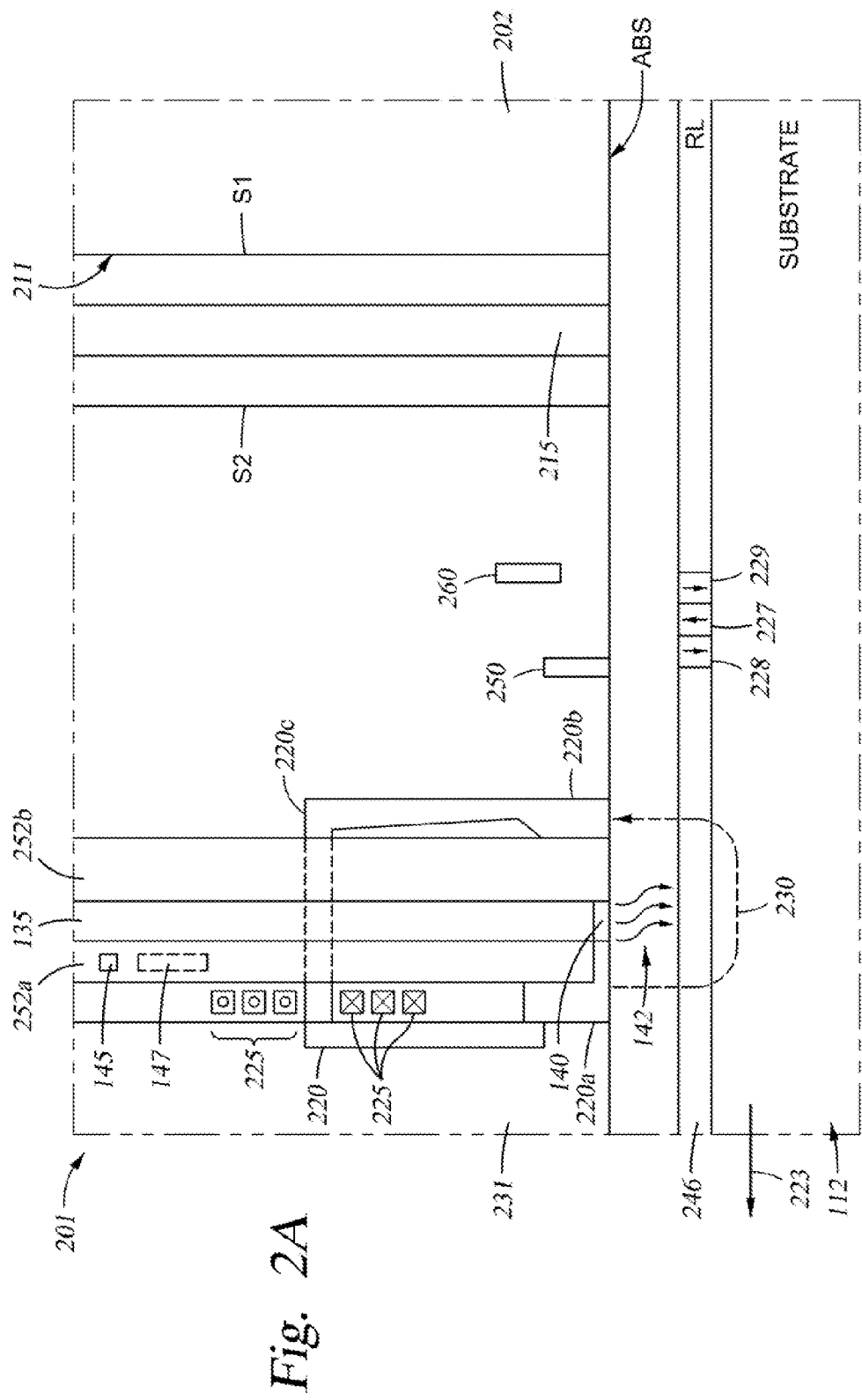
FIGS. 2A-2B illustrate a cross-sectional schematic diagram of a HAMR enabled head of a disk drive, according to one embodiment of the invention.

FIG. 2A illustrates a cross-sectional schematic diagram of a HAMR enabled disk drive, according to one embodiment of the invention. Specifically, FIG. 2A illustrates a portion of a head 201 and associated perpendicular magnetic recording disk 112 for a HAMR disk drive which uses an optical channel or waveguide 135 tor directing optical power to the disk. The disk 112 includes a disk substrate and a perpendicular magnetic recording layer (RL) 246. In one embodiment, the disk 112 may include an optional "soft" or relatively low-coercivity magnetically permeable underlayer (SUL). However, the SUL is not required tor a HAMR disk drive 100.

The RL 246 may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd). The RL 246 may also be an $L1_0$ ordered alloy such as FePt or FeNiPt. The disk 112 may also include a protective overcoat (not shown) over the RL 246.

The head 201 is formed on a substrate 202 and has a substrate trailing surface 211 and an ABS surface oriented generally perpendicular to trailing surface 211. The substrate 202 is typically formed of a composite material, such as a composite of alumina/titanium-carbide ($Al_2O_3$/TiC), and supports the read and write elements which are typically formed as a series of thin films and structures on the trailing surface 211. The disk 112 may spin in a direction 223 away from the trailing surface 211 and towards the other layers of the head 201. The ABS is the recording-layer-facing surface of the slider that faces the disk 112. Note that FIG. 2A is not drawn to scale because of the difficulty in showing the very small features and, for the sake of clarity, omits structures from the head such as spacing and insulating layers.

The head 201 includes a magnetoresistive read pole 215 located between shields S1 and S2, and a perpendicular write head that includes a magnetic yoke 220 with a write pole 220a and a return pole 220b, and an electrically conductive coil 225. The write pole 220a is formed of a high-moment material, such as a NiFe or FeCoNi alloy. The write coil 225 is wrapped around the yoke 220 with the electrical current directions being shown as into the paper by the coil cross-sections marked with an "X" and out of the paper by the coil cross-see lions marked with a solid circle. When write-current pulses are directed through the coil 225, the write pole 220a directs magnetic flux, represented by arrow 230, to the RL 246. Further, the magnetic flux 230 continues through the substrate or a SUL layer before arriving at the return pole 220b. However, the invention is not limited to the structure and material discussed above. For example, the coil 225 may be a helical coil or the write pole 220a may include a wrap-around shield. Further, the present invention may operate with any recording head that can perform the functions discussed herein.

The head 201 may also include the waveguide 135 with the NFT 140 near or at the ABS. As shown, the waveguide 135 and NFT 140 extend through the yoke 220 and are located between the write pole 220a and the return pole 220b. As noted by the ghosted lines, the yoke 220 may continuously connect the write pole 220a to the return pole 220b with a magnetic member 220c. The waveguide 135 and NFT 140 may be fabricated at any location such that the NFT 140 passes over a portion of the spinning magnetic disk 112 prior to that portion passing below the write pole 220a. Specifically, the waveguide 135 may be located between shield S2 and return pole 220b, or between the write pole 220a and the outer face 231 of the head 201 (if the disk 112 rotates opposite of the direction 223 shown).

While writing to the disk 112, the RL 246 moves relative to the head 201 in the direction shown by arrow 223. In HAMR, the optical energy 142 emitted from the NFT 140 temporarily heals up and lowers the coercivity ($H_c$) of the RL 246 so that the magnetic recording regions 227, 228, 229 may be oriented by the write field from write pole 220a. The magnetic recording regions 227, 228-229 become oriented by the write field if the write field ($H_w$) is greater than $H_c$. After a region of the RL 246 in the data track has been exposed to $H_w$ from the write pole 220a and the resulting heat from the optical energy 142 from the NFT 140, the region's temperature falls below the Curie temperature and the data associated with the magnetic orientations is recorded. Specifically, the transitions between recorded regions (such as previously recorded regions 227, 228, and 229) represent written data "bits" that can be read by the read pole 215. In this manner, the NFT 140 uses the optical energy 142 to heat the RL layer 246 and lower its magnetic coercivity.

The waveguide 135 is formed of a high-index-of-refraction dielectric material that is transmissive to radiation at the wavelength of the laser radiation source—e.g., around 780 nm. Typical radiation-transmissive materials include, for example, $TiO_2$ and $Ta_2O_5$. The radiation-transmissive waveguide 135 is surrounded by a cladding material 252a, 252b that has a lower refractive index than the waveguide 135 such as $SiO_2$ and $Al_2O_3$.

The head 201 may also include the waveguide sensor 145 and the reference sensor 147, both embedded in the cladding material 252a and positioned adjacent the waveguide 135. In one embodiment, the sensors 145, 147 are formed in the head 201 at the same time, so the sensors 145, 147 arc disposed in a plane that is parallel to the substrate 202. As a result, the sensors 145, 147 have the same electrical properties such as electrical resistance. The sensors 145. 147 are disposed at a location away from the ABS and the NFT 140. There may be a sufficient distance between the sensors 145, 147 and the NFT 140. During operation, the NFT 140 is heated by the laser 155. Thus, the sensors 145. 147 may be away from the NFT 140 so the sensors 145, 147 are not affected by the heat generated in the NFT 140. In one embodiment, the sensors 145, 147 are at least 1 micrometer away from the NFT 140. Within 1 micrometer from the NFT 140, the heat generated in the NFT 140 may affect the sensors 145, 147. In one embodiment, the sensors 145, 147 are more than 1 micrometer away from the NFT 140, such as about 2 micrometers. As shown in FIG. 2A, the sensors 145, 147 may be disposed above the yoke 220, which is about 10 micrometers away from the NFT 140. The sensors 145,147 may be disposed within the yoke 220. In one embodiment, the sensors 145, 147 are disposed within the yoke and are about 2 or more micrometers away from the ABS.

Figure 2B:
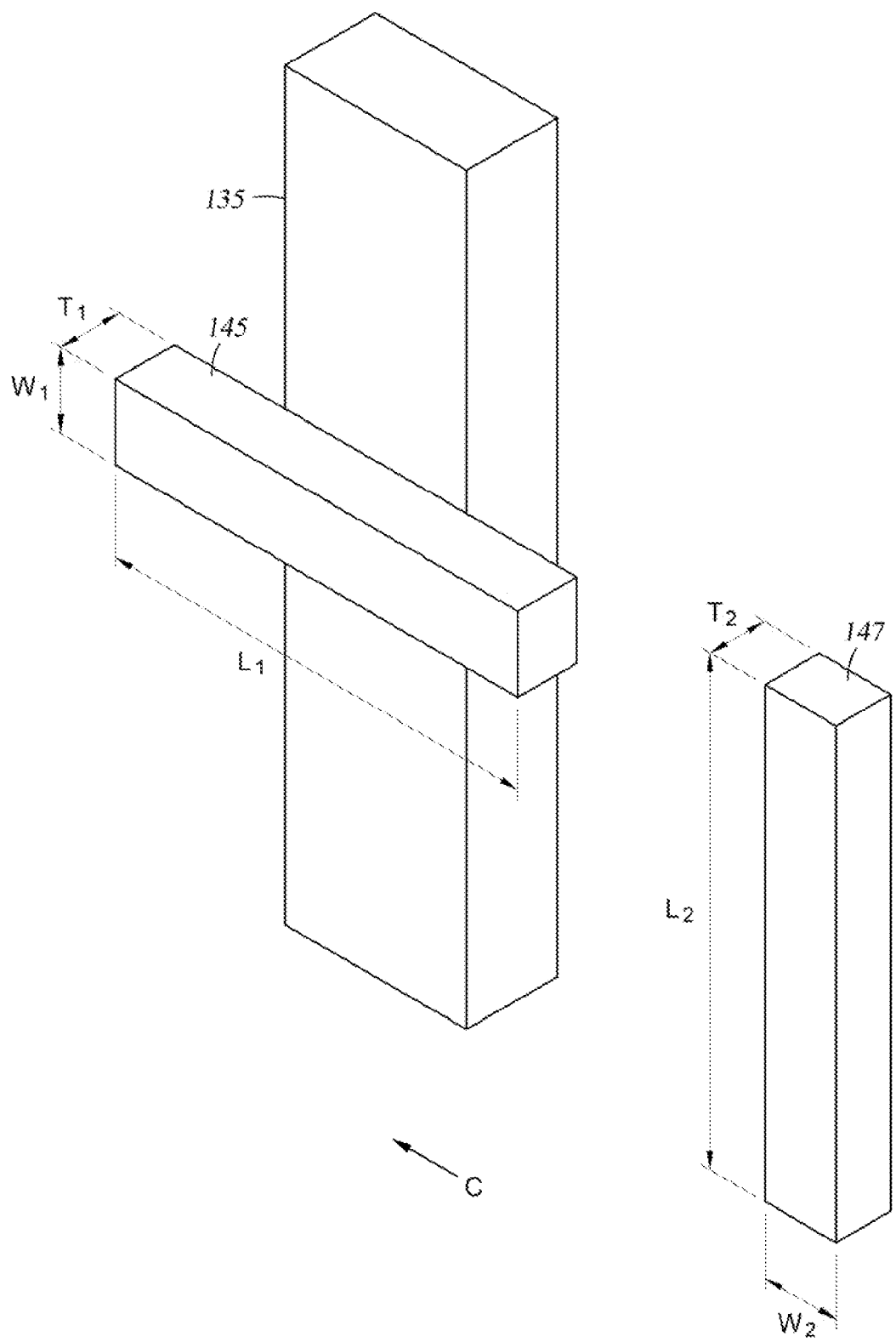

The two temperature sensors 145, 147 are better illustrated in FIG. 2B, which shows the waveguide sensor 145, the reference sensor 147, and the waveguide 135 disposed in a cross track direction, as indicated by arrow "C." The cladding material 252a is removed for better illustration. As shown in FIG. 2B, the waveguide sensor 145 has a length L1, a width W1, and a thickness T1. In one embodiment, the length L1 is greater than the width W1 and the thickness T1, and the waveguide sensor 145 is positioned so the length L1 is substantially parallel to the ABS and perpendicular to the waveguide 135. In one embodiment, the length L1 is substantially perpendicular to the waveguide 135, but not substantially parallel to the ABS. The reference sensor 147 is located farther away from the waveguide 135 than the waveguide sensor 145, so the reference sensor 147 and the waveguide sensor 145 have the same background temperature, yet the reference sensor 147 is not affected by the energy leaked from the waveguide 135. The reference sensor 147 has a length L2, a width W2. and a thickness T2. The length L2 is greater than the width W2 and the thickness T2. In one embodiment, the reference sensor 147 is positioned so the length L2 is perpendicular to the waveguide sensor 145 and substantially parallel to the waveguide 135. In one embodiment, the reference sensor 147 is positioned so the length L2 is parallel to the waveguide sensor 145. and the two sensors 145, 147 may or may not be disposed along the same axis. The waveguide sensor 145 is disposed adjacent the waveguide 135, and the distance between the waveguide 135 and the waveguide sensor 145 may range from 0-100 nanometers (nm), such as about 50 nm. The distance between the reference sensor 147 and the waveguide 135 may be greater than 100 nm. The reference sensor 147 is disposed at a sufficient distance away from the waveguide sensor 145 so the energy leaked from the waveguide 135 and sensed by the waveguide sensor 145 is not sensed by the reference sensor 147. In one embodiment, the distance between the sensors 145, 147 is about 1 to 2 micrometers.

An electrical contact sensor (ECS) 250 is disposed at the ABS between the read pole 215 and the return pole 220b. The contact sensor 250 is utilized for determining whether contact between the head 201 and the disk 112 has occurred. If the head 201 and the disk 112 are in contact, frictional heat may be generated that may change the resistance of the ECS 250. When the ECS 250 senses a contact between the head 201 and the disk 112, the head 201 is raised so there is a sufficient gap between the head 201 and the disk 112. A thermal flight height control (TFC) resistor, or a thermal actuator 260, is disposed in the head 201. The thermal actuator 260 thermally actuates the head 201 by creating a protrusion at the ABS, which controls the distance between the elements in the head 201 and the disk 112.

Adding the waveguide sensor 145 and the reference sensor 147 to the head 201 does not increase the number of electrical contacts already existed. In one embodiment, there are eight electrical contacts: two for the reader, two for the writer, two for the ECS 250 and two for the thermal actuator 260. With the addition of the sensors 145, 147, the electrical contacts for the ECS 250 and a TFC ground is utilized. Detail of how the waveguide sensor 145, the reference sensor 147, and the ECS 250 are utilized is described below.

Figure 3A:
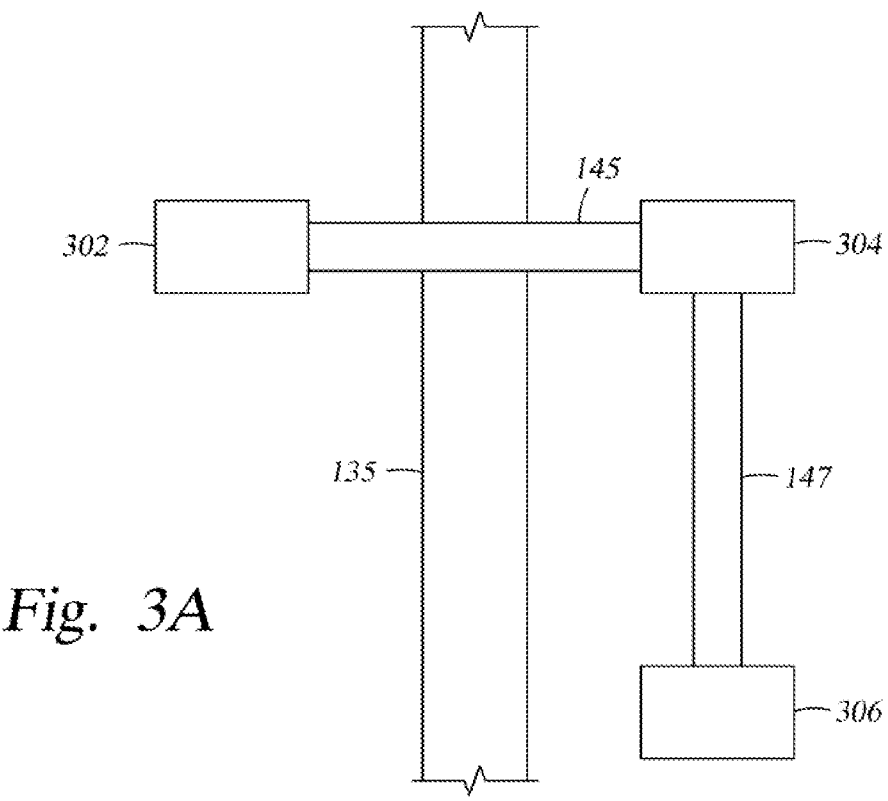
FIGS. 3A-3D illustrate the usage of a waveguide sensor, a reference sensor and a contact sensor, according to one embodiment of the invention.

FIGS. 3A-3D illustrate how the waveguide sensor 145, the reference sensor 147 and the ECS 250 are utilized according to embodiments of the invention. As shown in FIG. 3A, the waveguide sensor 145 is connected to electrical contacts 302, 304, and the reference sensor 147 is connected to the electrical contacts 304 and the ground 306. The ECS 250 is connected to the electrical contact 302 and the ground 306 (shown in FIG. 3B), Thus, no additional electrical contacts are needed for the waveguide sensor 145 and the reference sensor 147.

Figure 3B:
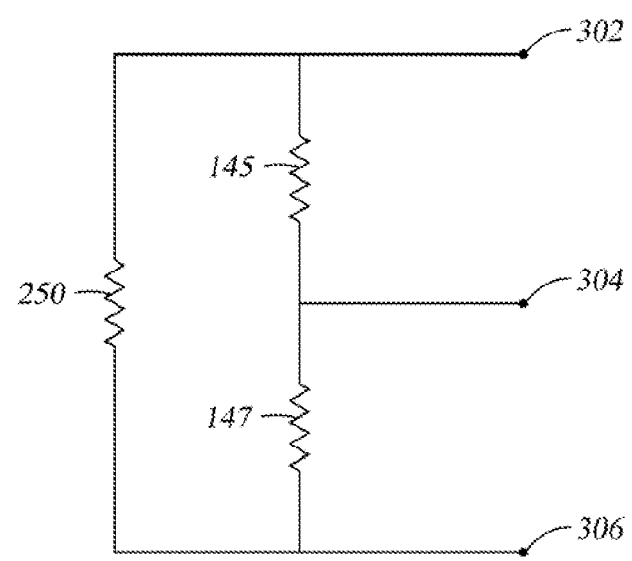

FIG. 3B is a circuit diagram showing the ECS 250. the waveguide sensor 145 and the reference sensor 147. In one embodiment, a dual ECS function is employed by setting the voltage at 302 equals to the voltage at 304, so no current flows through the waveguide sensor 145. This is used to determine the change in ECS 250 resistance due to contact while subtracting any effect from background temperature using the reference sensor 147. The two electrical contacts 302, 304 may be connected in the preamp to ensure the voltage at the two contacts 302, 304 are the same. In one embodiment, the waveguide power is measured by applying a voltage at 302 and measuring the voltage at 304, This can be used to determine the change in resistance of the waveguide sensor 145, which is proportional to the waveguide power. This value can he determined at the end of each written sector (which takes approximately 10 micro seconds ($\mu$s) to write) as long as the thermal time constant of the sensors 145, 147 is faster than approximately 1 $\mu$s. Alternatively, one can switch the ECS 250 and the waveguide sensor 145 and use the current difference method for the dual power monitor and voltage divider method for the dual ECS function.

Figure 3C:
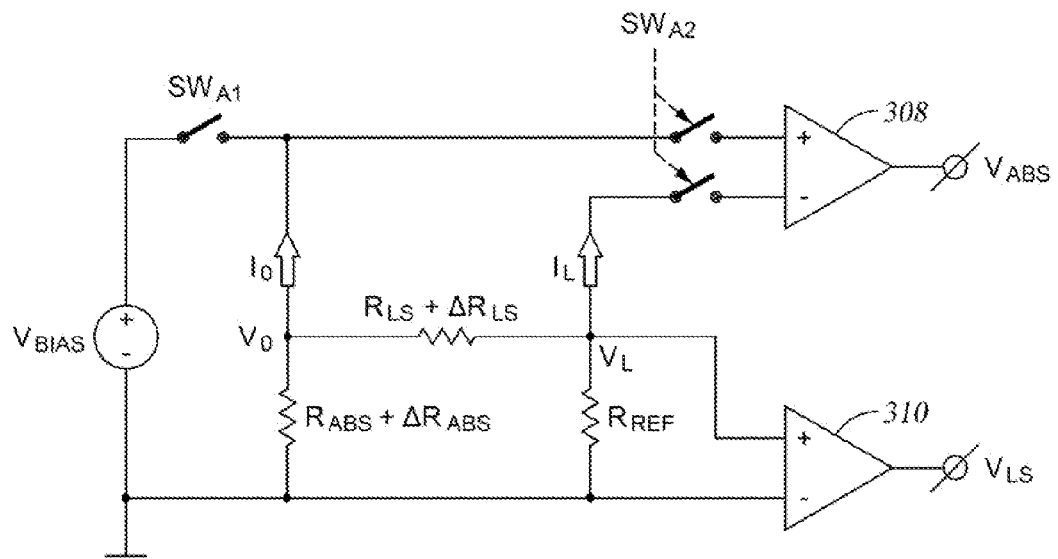

FIG. 3C is a circuit diagram showing the ECS 250, the waveguide sensor 145 and the reference sensor 147 according to another embodiment. As shown in FIG. 3C, $R_{ABS}+\Delta R_{ABS}$ may be the ECS 250, $R_{LS}+\Delta R_{LS}$ may be the waveguide sensor 145 and $R_{REF}$ may be the reference sensor 147. Two switches $SW_{a1}$ and $SW_{a2}$ are included in the circuit diagram. In one embodiment, the switch $SW_{a1}$ is open and the switch $SW_{a2}$ is closed, which is configured to measure $\Delta R_{ABS}$ with respect to $R_{REF}$. To do so, $V_0$ is set substantially equal to $V_L$, and the difference in current $I_0$ and $I_L$ is measured through a differential transconductance low noise amplifier 308. The output voltage changes in $V_{ABS}$ indicate changes in $\Delta R_{ABS}$. In another embodiment, the switch $SW_{a1}$ is closed and $SW_{a2}$ is open, which is configured to measure $\Delta R_{LS}$ with respect to $R_{REF}$. To do so, a bias voltage $V_{Bias}$ is set to equal to $V_0$, and the change in $V_L$ is measured through a single-ended low noise amplifier 310. The output voltage changes in $V_{LS}$ indicate changes in $\Delta R_{LS}$.

Figure 3D:
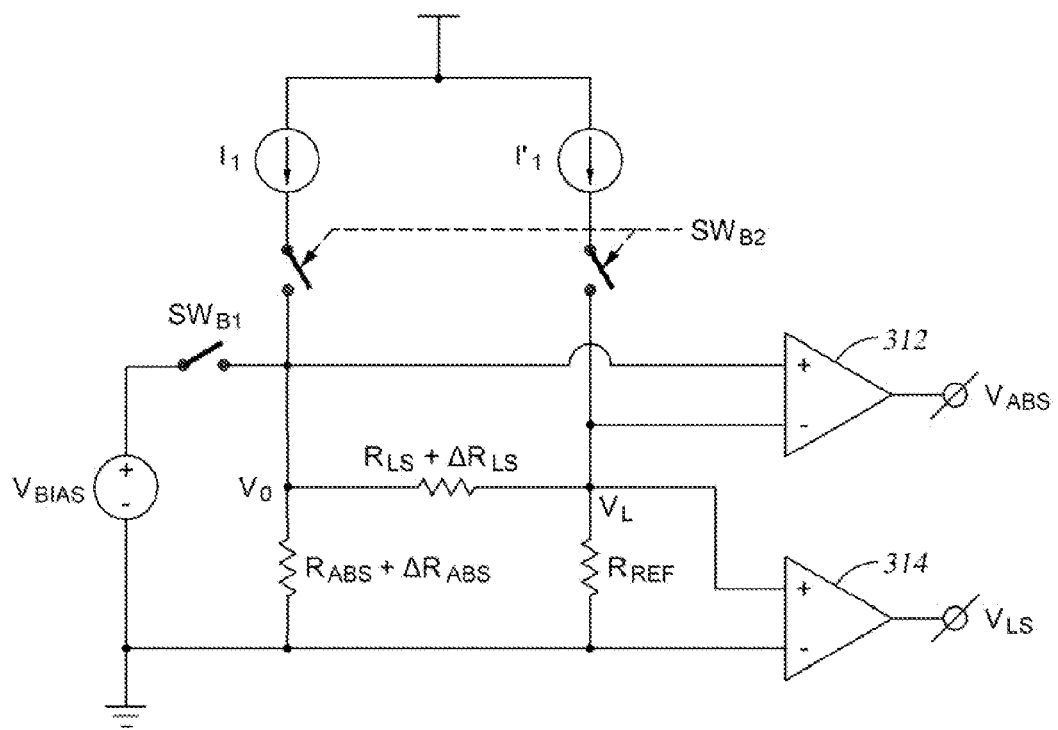

FIG. 3D is a circuit diagram showing the ECS 250, the waveguide sensor 145 and the reference sensor 147 according to another embodiment. As shown in FIG. 3D, $R_{ABS}+\Delta R_{ABS}$ may be the ECS 250, $R_{LS}+\Delta R_{LS}$ may be the waveguide sensor 145 and $R_{REF}$ may be the reference sensor 147. Two switches $SW_{b1}$ and $SW_{b2}$ are included in the circuit diagram. In one embodiment, the switch $SW_{b1}$ is open and the switch $SW_{b2}$ is closed, which is configured to measure $\Delta R_{ABS}$ with respect to $R_{REF}$. To do so, $I_1$ is set substantially equal to $I'_1$, and the difference in voltage $V_0$ and $V_L$ is measured through a differential transconductance low noise amplifier 312. The output voltage changes in $V_{ABS}$ indicate changes in $\Delta R_{ABS}$. In another embodiment, the switch $SW_{b1}$ is closed and $SW_{b2}$ is open, which is configured to measure $\Delta R_{LS}$ with respect to $R_{REF}$. To do so, a bias voltage $V_{Bias}$ is set to equal to $V_0$, and the change in $V_L$ is measured through a single-ended low noise amplifier 314. The output voltage changes in $V_{LS}$ indicate changes in $\Delta R_{LS}$.

Figure 4:
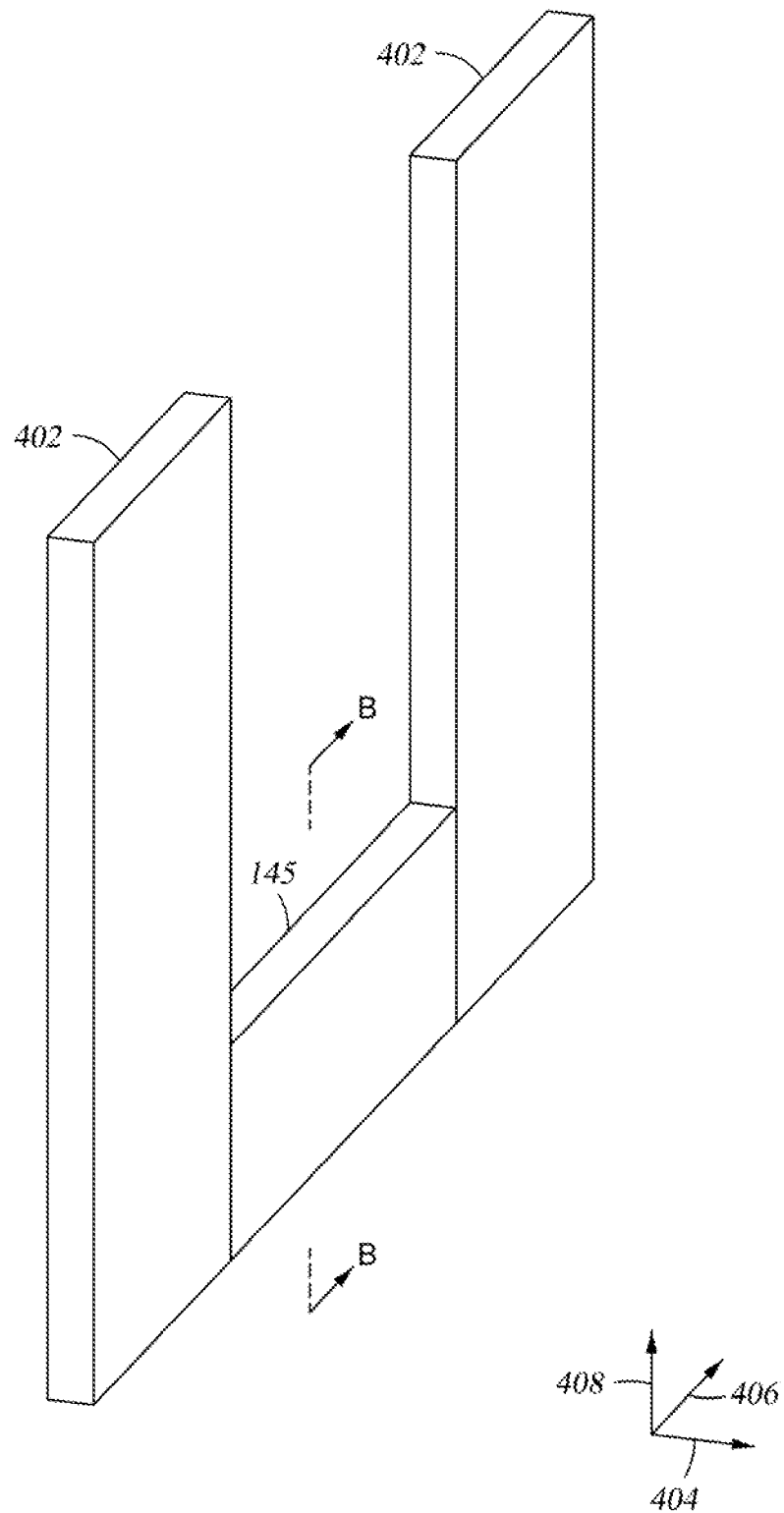
FIG. 4 is a schematic of a sensor with sensor leads, according to one embodiment of the invention.

FIG. 4 is a schematic of the waveguide sensor 145 with sensor leads 402, according to one embodiment of the invention. As shown, the waveguide sensor 145 is connected to two sensor leads 402 on opposite ends. However, the sensor leads 402 may be connected to the waveguide sensor 145 in whatever manner that permits an electric current to flow through at least a portion of the waveguide sensor 145 when a voltage potential is applied across the sensor leads 402. The dotted line "B-B" illustrates the cross sectional view that is shown in FIG. 2A of the sensor 145.

Suitable materials for the waveguide sensor 145 include Ta, Pt, Au, Rh, NiFe, or alloys thereof. The sensor leads 402 may comprise Ru with thickened Cu/Ta leads. The waveguide sensor 145 may have a length ranging from about 1 micrometer (μm) to 3 μm, a height ranging from about 100 nm to 400 nm, and a thickness ranging from about 25 nm to 100 nm. As used herein, arrow 404 corresponds to the direction of the thickness, arrow 406 corresponds to the direction of the length, and arrow 408 corresponds to the direction of the height of the structures illustrated in the three-dimensional FIG. 4. The reference sensor 147 may be identical to the waveguide sensor 145 in all aspects.

Figure 5A:
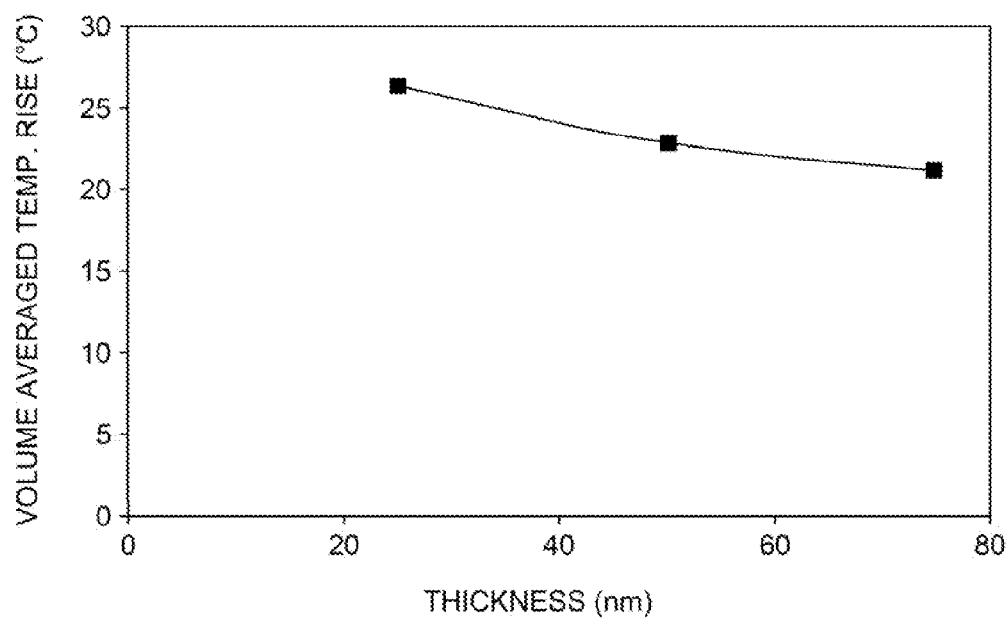
FIGS. 5A-5B are graphs showing the effect of the thickness of the waveguide sensor, according to one embodiment of the invention.
Figure 5B:
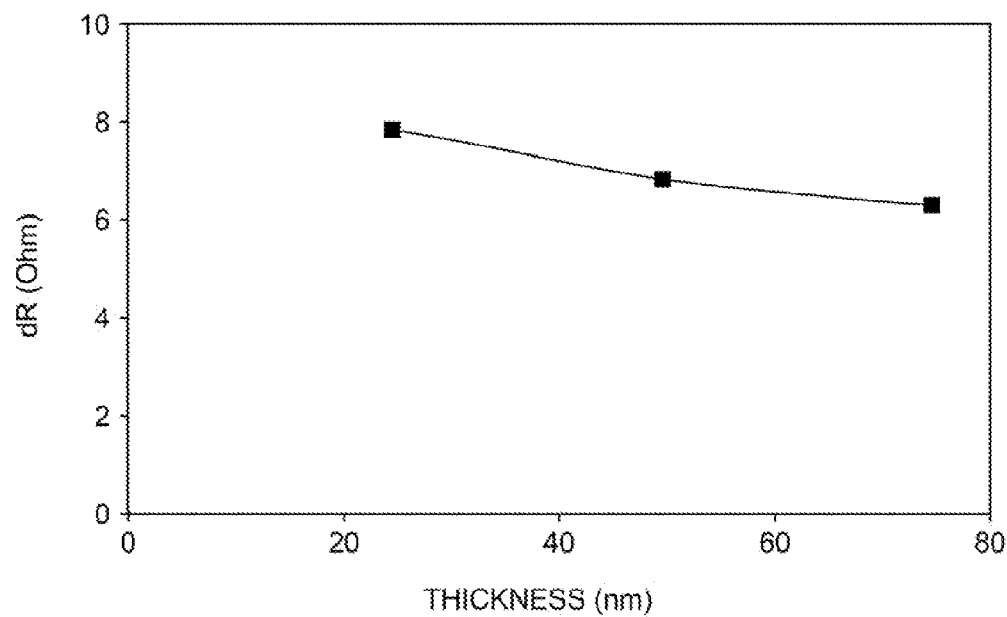

For fixed sensor cross-section area, the heat absorption and temperature rise vary with the sensor thickness. The temperature rise vs. thickness of the sensor is shown in FIGS. 5A-5B. As shown in FIGS. 5A-5B, thinner sensor leads to higher temperature and resistance change.

Figure 6A:
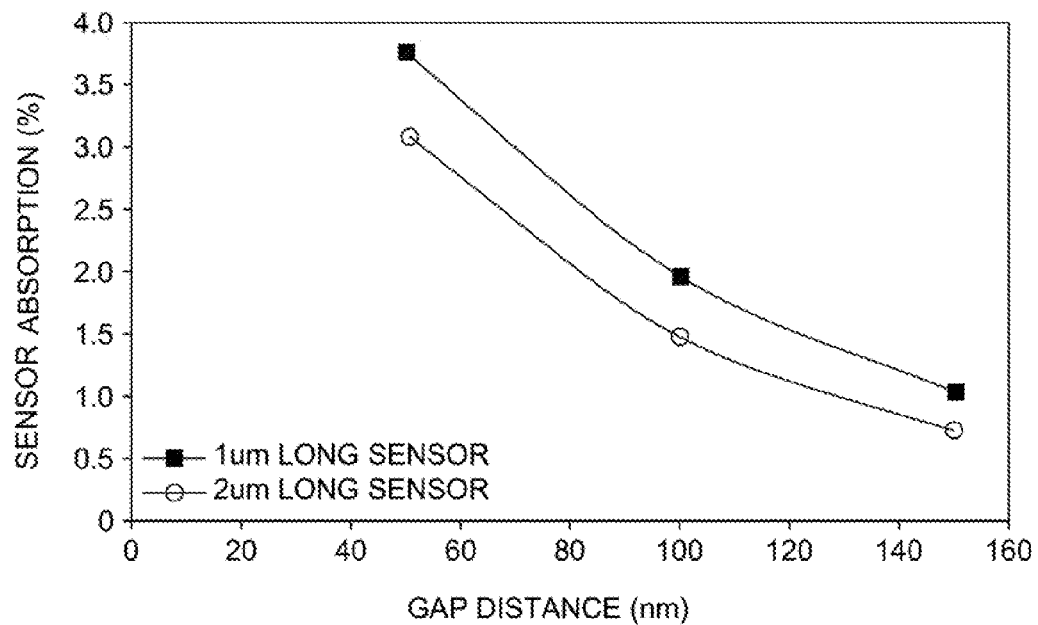
FIGS. 6A-6B are graphs showing the effect of the distance between the waveguide sensor and the waveguide, according to one embodiment of the invention.
Figure 6B:
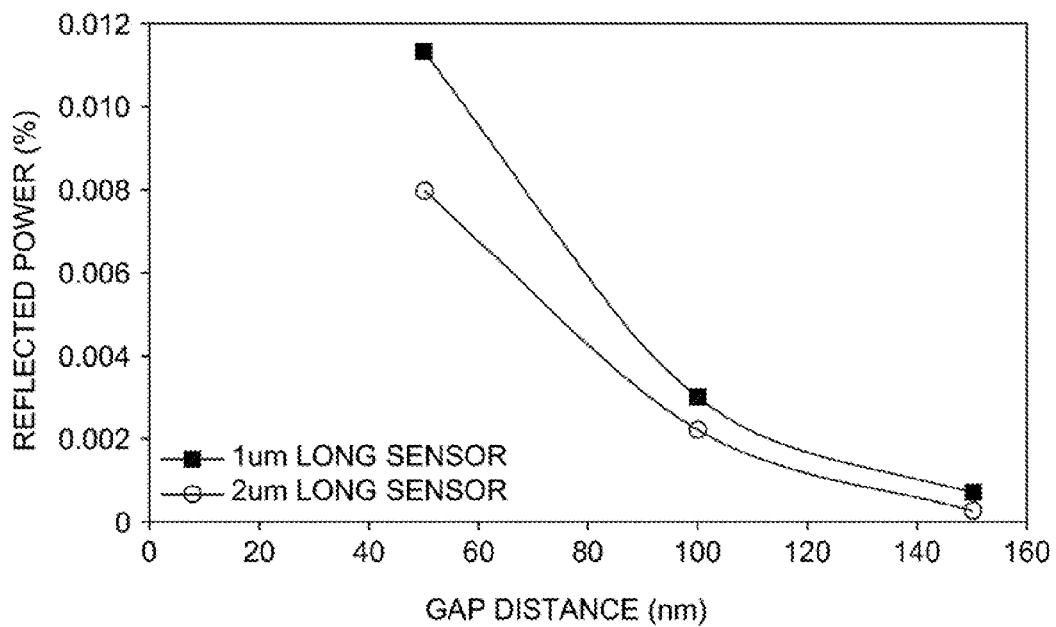

FIGS. 6A-6B are graphs showing the effect of the distance (gap distance) between the waveguide sensor 145 and the waveguide 135. One can control the fraction of the power absorbed by the waveguide sensor 145 by adjusting the gap distance. Typical values are about 50 nm for approximately five percent absorbed power. FIG. 6B shows that the reflectance from the waveguide sensor 145 is very small to avoid any problems with coherency or laser feedback. In one embodiment, the nominal resistance is about 100 ohms, the temperature rise that balances the need for high signal and high reliability is about 50 degrees Celsius to 100 degrees Celsius, the power absorbed is low such as from about 0.1 mW to 0.3 mW, and the temperature rise time is fast such as less than 1 μs.

In summary, a HAMR device is disclosed. The device has two temperature sensors: a waveguide sensor disposed adjacent the waveguide and a reference sensor disposed near the waveguide sensor. The waveguide sensor has a length, a width and a thickness, and the length is greater than the width and the thickness. The length of the waveguide sensor is substantially parallel to the ABS in a cross track direction. The waveguide sensor and the reference sensor are both connected to existing electrical contacts. Thus, no new electrical contacts are needed. With the two temperature sensors, the optical power may be monitored while no optical components are needed, no additional assembly steps are needed, and no significant reflectance is added to the system which can create interference effects due to the coherency of the laser light. In addition, with two temperature sensors, temperature variation due to optical power fluctuation or slider flight condition change may be differentiated.

While the foregoing is directed to embodiments of the present invention, other and further embodiments of the invention may be devised without departing from the basic scope thereof, and the scope thereof is determined by the claims that follow.

What is claimed is:

1. A heat assisted magnetic recording device, comprising:
a waveguide;
a first temperature sensor disposed adjacent the waveguide and adapted to be heated by an optical power passing through the waveguide, wherein the first temperature sensor is about two or more micrometers away from an air bearing surface, wherein the first temperature sensor has a first length, a first width and a first thickness, and the first length is greater than the first width and the first thickness, and wherein the first length is substantially perpendicular to the waveguide; and
a second temperature sensor, wherein the second temperature sensor has a second length, a second width and a second thickness, and the second length is greater than the second width and the second thickness, and wherein the length is substantially perpendicular to the first length.

2. The heat assisted magnetic recording device of claim 1, wherein the first length of the first temperature sensor is disposed adjacent the waveguide in a cross track direction.

3. The heat assisted magnetic recording device of claim 1, wherein a distance between the first temperature sensor and the waveguide ranges from 0 nm to 100 nm and a cladding material is disposed between the first temperature sensor and the waveguide.

4. The heat assisted magnetic recording device of claim 1, wherein the first temperature sensor includes a material selected from the group consisting of Ta, Pt, Au, Rh, NiFe, and alloys thereof.

5. The heat assisted magnetic recording device of claim 1, wherein the first length of the first temperature sensor ranges from about 1 μm to 3 μm, the first width ranges from about 100 nm to 400 nm, and the first thickness ranges from about 25 nm to 100 nm.

6. The heat assisted magnetic recording device of claim 1, wherein the second temperature sensor is disposed away from the waveguide and is adapted to measure a background temperature, wherein a distance between the second temperature sensor and the waveguide is over 100 nm.

7. The heat assisted magnetic recording device of claim 6, wherein a resistance change of the first temperature sensor relative to the second temperature sensor is measured to determine a temperature change.

8. The heat assisted magnetic recording device of claim 6, wherein the second temperature sensor includes a material selected from the group consisting of Ta, Pt, Au, Rh, NiFe, and alloys thereof.

9. The heat assisted magnetic recording device of claim 8, wherein the first temperature sensor and the second temperature sensor share a common electrical contact.

10. The heat assisted magnetic recording device of claim 9, further comprising an electrical contact sensor, wherein the electrical contact sensor shares a common electrical contact with the first temperature sensor or the second temperature sensor.

11. The heat assisted magnetic recording device of claim 10, wherein the electrical contact sensor is connected to a first and a second electrical contact, wherein the first electrical contact is also connected to the first temperature sensor and the second electrical contact is also connected to the second temperature sensor.

12. A heat assisted magnetic recording device, comprising:
a return pole;
a first cladding material disposed adjacent the return pole;
a waveguide disposed adjacent the first cladding material;
a second cladding material disposed adjacent the waveguide;
a write pole disposed adjacent the second cladding material;
a first temperature sensor disposed adjacent the waveguide and adapted to be heated by an optical power passing through the waveguide, wherein the first temperature sensor is about two or more micrometers away from an air bearing surface, wherein the first temperature sensor has a first length, a first width and a first thickness, and the first length is greater than the first width and the first thickness, and wherein the first length is substantially perpendicular to the waveguide; and
a second temperature sensor, wherein the second temperature sensor has a second length, a second width and a second thickness, and the second length is greater than the second width and the second thickness, and wherein the length is substantially perpendicular to the first length.

13. The heat assisted magnetic recording device of claim 12, wherein the first length of the first temperature sensor is disposed adjacent the waveguide in a cross track direction.

14. The heat assisted magnetic recording device of claim 12, wherein a distance between the first temperature sensor and the waveguide ranges from 0 nm to 100 nm.

15. The heat assisted magnetic recording device of claim 12, wherein the first temperature sensor includes a material selected from the group consisting of Ta, Pt, Au, Rh, NiFe, and alloys thereof.

16. The heat assisted magnetic recording device of claim 12, wherein the first length of the first temperature sensor ranges from about 1 µm to 3 µm, the first width ranges from about 100 nm to 400 nm, and the first thickness ranges from about 25 nm to 100 nm.

17. The heat assisted magnetic recording device of claim 12, wherein the second temperature sensor is disposed away from the waveguide and is adapted to measure a background temperature, wherein a distance between the second temperature sensor and the waveguide is over 100 nm.

18. The heat assisted magnetic recording device of claim 17, wherein the second temperature sensor includes a material selected from the group consisting of Ta, Pt, Au, Rh, NiFe, and alloys thereof.

19. The heat assisted magnetic recording device of claim 18, wherein the first temperature sensor and the second temperature sensor share a common electrical contact.

20. The heat assisted magnetic recording device of claim 19, further comprising an electrical contact sensor, wherein the electrical contact sensor shares a common electrical contact with the first temperature sensor or the second temperature sensor.

21. The heat assisted magnetic recording device of claim 20, wherein the electrical contact sensor is connected to a first and a second electrical contact, wherein the first electrical contact is also connected to the first temperature sensor and the second electrical contact is also connected to the second temperature sensor.

* * * * *

UNITED STATES PATENT AND TRADEMARK OFFICE
CERTIFICATE OF CORRECTION

PATENT NO. : 9,047,926 B2
APPLICATION NO. : 14/057044
DATED : June 2, 2015
INVENTOR(S) : Contreras et al.

It is certified that error appears in the above-identified patent and that said Letters Patent is hereby corrected as shown below:

Specification

Column 3, Line 42, please delete "healing" and insert --heating-- therefor;

Column 3, Line 58, please delete "hearing" and insert --bearing-- therefor;

Column 4, Line 5, please delete "tine" and insert --line-- therefor;

Column 4, Line 7, please delete "12S" and insert --128-- therefor;

Column 4, Line 14, please delete "only, it" and insert --only. It-- therefor;

Column 4, Line 67, please delete "(RID)" and insert --(RTD)-- therefor;

Column 5, Line 7, please delete "he" and insert --be-- therefor;

Column 5, Line 27, please delete "dolled" and insert --dotted-- therefor;

Column 5, Line 46, please delete "tor" and insert --for-- therefor;

Column 5, Line 51, please delete "tor" and insert --for-- therefor;

Column 6, Line 15, please delete "cross-see lions" and insert --cross-sections-- therefor;

Column 6, Line 43, please delete "heals" and insert --heats-- therefor;

Column 7, Line 3, please delete "arc" and insert --are-- therefor;

Column 7, Line 6, please delete "145." and insert --145,-- therefor;

Column 7, Line 10, please delete "145." and insert --145,-- therefor;

Column 7, Line 42, please delete "W2." and insert --W2,-- therefor;

Signed and Sealed this
First Day of December, 2015

Michelle K. Lee
*Director of the United States Patent and Trademark Office*

Page 1 of 2

Column 7, Line 48, please delete "145." and insert --145,-- therefor;

Column 8, Line 24, please delete "(shown in FIG. 3B)," and insert --(shown in FIG. 3B).-- therefor;

Column 8, Line 27, please delete "250." and insert --250,-- therefor.